United States Patent [19]

Mitchell et al.

[11] Patent Number: 4,701,504
[45] Date of Patent: Oct. 20, 1987

[54] REDUCTION OF ISOMERIZATION IN SOLUTION PROCESS FOR POLYMERIZATION OF ALPHA-OLEFINS

[75] Inventors: David J. Mitchell; Vaclav G. Zboril, both of Kingston, Canada

[73] Assignee: Du Pont Canada Inc., Mississauga, Canada

[21] Appl. No.: 824,354

[22] Filed: Jan. 23, 1986

[51] Int. Cl.$^4$ .......................... C08F 2/42; C08F 6/06; C08F 6/10
[52] U.S. Cl. ...................... 526/83; 524/188; 524/251; 524/428; 528/485; 528/486
[58] Field of Search .............. 528/485, 486, 488, 492; 524/428, 188, 251; 526/83

[56] References Cited

U.S. PATENT DOCUMENTS

| | | | |
|---|---|---|---|
| 2,921,057 | 1/1960 | Mertzweiler | 260/93.7 |
| 3,293,235 | 12/1966 | Cavender et al. | 260/94.9 |
| 3,773,743 | 11/1973 | Ainsworth, Jr. et al. | 528/492 X |
| 4,430,488 | 2/1984 | Zboril | 528/486 X |
| 4,476,297 | 10/1984 | Kablitz et al. | 528/486 |

FOREIGN PATENT DOCUMENTS

| | | | |
|---|---|---|---|
| 575808 | 5/1959 | Canada | 401/67 |
| 666699 | 7/1963 | Canada | 401/67 |
| 731749 | 4/1966 | Canada | 401/95 |
| 0067645 | 12/1985 | European Pat. Off. | 528/485 |

Primary Examiner—Joseph L. Schofer
Assistant Examiner—F. M. Teskin

[57] ABSTRACT

A solution polymerization process for the preparation of high molecular weight polymers of alpha-olefins selected from the group consisting of homopolymers of ethylene and copolymers of ethylene and $C_4$–$C_{12}$ alpha-olefins is disclosed. The process comprises feeding monomer(s), coordination catalyst and inert hydrocarbon solvent to a reactor, polymerizing the monomers at a temperature of up to 320° C. and a pressure of less than 25 MPa, and deactivating the catalyst in the solution so obtained. The catalyst is deactivated by sequentially admixing therewith a minor amount of a nitrogenous base, especially an aqueous solution of such a base, followed by a solution of a salt of an alkaline earth metal or zinc and an aliphatic monocarboxylic acid dissolved in hydrocarbon solvent. The ratio of water:nitrogenous base should not be greater than 5. The hydrocarbon solvent and other volatile matter are then separated from the resultant solution and a composition comprising said high molecular weight polymer is recovered. The amount of nitrogenous base plus any water is not more than 2.5 moles per mole of halogen plus alkyl radicals in the coordination catalyst.

13 Claims, No Drawings

REDUCTION OF ISOMERIZATION IN SOLUTION PROCESS FOR POLYMERIZATION OF ALPHA-OLEFINS

The present invention relates to a process for the polymerization of alpha-olefins and especially to a reduction of isomerization in a solution process for the polymerization of ethylene and higher alpha-olefins. In particular the present invention relates to such reduction of isomerization in a process in which deactivated catalyst is not separated from the polymer.

Polymers of ethylene, for example, homopolymers of ethylene and copolymers of ethylene and higher alpha-olefins, are used in large volumes for a wide variety of end uses, for example, in the form of film, fibres, moulded or thermoformed articles, pipe, coatings and the like.

Processes for the preparation of, in particular, copolymers of ethylene and higher alpha-olefins are known. Such processes include processes in which the monomers are polymerized in the presence of a coordination catalyst, for example, a catalyst comprising a compound of a transition metal belonging to Groups IVB–VIB of the Periodic Table and an organometallic compound of a metal belonging to Groups I–IIIA of the Periodic Table.

A particularly preferred process for the polymerization of alpha-olefins is the high temperature or "solution" polymerization process, an example of which is described in Canadian Pat. No. 660 869 of A. W. Anderson, E. L. Fallwell and J. M. Bruce, which issued Apr. 9, 1963. In a solution process the process parameters are selected in such a way that both the monomer and polymer are soluble in the reaction medium. Under such conditions accurate control over the degree of polymerization, and hence the molecular weight of the polymer obtained, may be achieved, for example, by control of the reaction temperature. Solution processes are also disclosed in Canadian Pat. No. 1 171 065 of V. G. Zboril, M. A. Hamilton and R. W. Rees and No. 1 171 066 of V. G. Zboril and M. A. Hamilton, both issued July 17, 1984, and Canadian Patent Application No. 458 019 of M. A. Hamilton, D. A. Harbourne, C. G. Russell, V. G. Zboril and R. Mulhaupt, filed July 3, 1984.

The polymerization reaction in a solution polymerization process is normally terminated by addition of a socalled "deactivator". A wide variety of compounds are capable of deactivating the coordination catalyst, especially at the high temperatures used in a solution polymerization process. However, a deactivator must meet other, more stringent, criteria in order to be acceptable for use in a commercial process. For instance, if a so-called catalyst removal process is used, both the deactivated catalyst residues and the deactivator must be capable of being removed from the reaction mixture in such a removal process. If the deactivated catalyst remains in the polymer, the deactivator and deactivated catalyst residues must not cause problems in the separation of polymer from solvent and unreacted monomers, in the processing of the polymer obtained and in the resultant fabricated articles. In any event, the polymer must have commercially-acceptable colour, odour and toxicity properties. It is particularly difficult to assess the possible effects of a potential deactivator at the high temperatures of a solution process, especially with regard to isomerization of comonomers, degradation of the deactivator, generation of coloured species, reaction with antioxidants and other stabilizers and the like. Moreover, the behavior of the deactivator may be quite sensitive to changes in the operation of a solution process.

Deactivators for solution polymerization processes are known, for example, a fatty acid or an alcohol. The fatty acid is admixed with hydrocarbon solvent, normally the solvent of the polymerization process, and fed into the polymerization mixture, usually shortly after that mixture passes from the reactor. The polymerization mixture that has been treated with deactivator contains catalyst residues which may be removed by contacting the mixture with an adsorbent, for example, alumina. Such a deactivation and catalyst removal process is described in Canadian Pat. No. 732 279 of B. B. Baker, K. M. Brauner and A. N. Oemler, which issued Apr. 12, 1966. The treatment of polyethylene and/or the deactivation of coordination catalysts using nitrogeneous bases, especially nitrogeneous bases in the presence of an alcohol, is disclosed in Canadian Pat. No. 567 931 of R. N. Haward et al., which issued Dec. 23, 1958, 575 808 of F. A. Bartolomeo et al., which issued May 12, 1959 and No. 666 699 of C. E. Brockway et al., which issued July 16, 1963, and in U.S. Pat. No. 2,921,057 of J. K. Mertzweiller, which issued Jan. 12, 1960.

Coordination catalysts containing vanadium may conveniently be deactivated by contacting the polymerization mixture with a solution of a salt of an alkaline earth metal or zinc and an aliphatic monocarboxylic acid dissolved in the hydrocarbon solvent used in the polymerization process. Such deactivation of coordination catalysts containing vanadium tends to result in polymer of improved colour, as is disclosed in Canadian Pat. No. 1 165 499 of V. G. Zboril, which issued Apr. 10, 1984. Titanium-based coordination catalysts used in a solution polymerization process may be deactivated to give polymer of improved colour by sequentially contacting the polymerization mixture with a minor amount of water and then with a solution of a salt of an alkaline earth metal or zinc and an aliphatic monocarboxylic acid dissolved in a hydrocarbon solvent, preferably the solvent used in the polymerization process, as is disclosed in Canadian Pat. No. 1 173 599 of M. A. Hamilton, D. A. Harbourne and V. G. Zboril, which issued Aug. 28, 1984.

It has now been found that the level of isomerization of alpha-olefins having at least four carbon atoms that may occur on sequential deactivation of a coordination catalyst using water and a salt of an alkaline earth metal or zinc and an aliphatic monocarboxylic acid may be reduced by contacting the coordination catalyst with a minor amount of a nitrogenous base, especially an aqueous solution of the nitrogenous base, prior to contacting the catalyst with the above salt. Polymers of acceptable colour are obtainable, regardless of whether or not the monomers can undergo isomerization.

Accordingly, the present invention provides a solution polymerization process for the preparation of high molecular weight polymers of alpha-olefins selected from the group consisting of homopolymers of ethylene and copolymers of ethylene and $C_4$–$C_{12}$ higher alpha-olefins, said process comprising feeding monomer selected from the group consisting of ethylene and mixtures of ethylene and at least one $C_4$–$C_{12}$ higher alpha-olefin, a coordination catalyst and inert hydrocarbon solvent to a reactor, said catalyst being a titanium-based and/or vanadium-based coordination catalyst, polymerizing said monomer at a temperature of up to 320° C. and a pressure of less than 25 MPa, deactivating the catalyst in the solution so obtained by sequentially admixing therewith a minor amount of a nitrogenous base followed by a solution of a salt of an alkaline earth metal or zinc and aliphatic monocarboxylic acid dissolved in hydrocarbon solvent, said nitrogenous base being of the formula $NR^1R^2R^3$, where $R^1$, $R^2$ and $R^3$ are independently selected from the group consisting of H, saturated alkyls having 1–20 carbon atoms and $-SiR^4R^5R^6$ where each of $R^4$, $R^5$ and $R^6$ is independently selected from saturated alkyls having 1–20 carbon atoms, with the proviso that the nitrogenous base does not contain more than two $-SiR^4R^5R^6$ groups, separating the hydrocarbon solvent and other volatile matter from the resultant solution and recovering a composition comprising said high molecular weight polymer, the amount of the nitrogenous base being not more than 2.5 moles of nitrogenous base per mole of halogen plus alkyl radicals in the coordination catalyst.

In a preferred embodiment of the process of the present invention, the nitrogenous base is an aqueous solution of the nitrogenous base and the amount of nitrogenous base plus water is less than 2.5 moles per mole of halogen plus alkyl radicals in the coordination catalyst.

In another embodiment of the process of the present invention, the carboxylic acid is a $C_8$–$C_{10}$ carboxylic acid and the alkaline earth metal is calcium.

In a further embodiment the coordination catalyst is a titanium-based coordination catalyst.

The present invention is directed to a solution polymerization process for the preparation of high molecular weight polymers of alpha-olefins. In particular the polymers of alpha-olefins are homopolymers of ethylene or copolymers of ethylene and higher alpha-olefins, especially such higher alpha-olefins having 4 to 12 carbon atoms i.e. $C_4$–$C_{12}$ alpha-olefins, including bicyclic alpha-olefins, examples of which are butene-1, hexene-1, octene-1 and bicyclo-(2,2,1)-2-heptene. In addition cyclic endomethylenic dienes may be fed to the process with the ethylene or mixtures of ethylene and $C_4$–$C_{12}$ alpha-olefin, as is described in Canadian Pat. No. 980 498 of C. T. Elston, which issued Dec. 23, 1975.

In a solution polymerization process of the present invention monomer, a coordination catalyst and inert hydrocarbon solvent are fed to a reactor. Coordination catalysts for solution polymerization processes are known, for example those described in the aforementioned Canadian Pat. Nos. 660 869, 1 171 065 and 1 171 066, in Canadian Pat. No. 1 119 154 of A. N. Mollison and V. G. Zboril, which issued Mar. 2, 1982 and in the aforementioned Canadian Patent Application No. 458 019. Such coordination catalysts may be titanium-based and/or vanadium based catalysts, especially titanium-based or titanium/vanadium-based catalysts in which 20–100% of the transition metal is titanium. The monomer is ethylene or a mixture of ethylene and one or more of the higher alpha-olefins.

Solution polymerization processes may be operated at temperatures of up to 320° C. and especially in the range 105°–310° C., the lower temperature being above the lowest solubilization temperature of the polymer, as will be understood by those skilled in the art of solution polymerization processes. The pressures used in the process of the present invention are those known for solution polymerization processes viz. less than 25 MPa and especially in the range of about 4–25 MPa. The pressure and temperature are controlled so that both the unreacted monomers and the polymers formed remain in solution.

The hydrocarbon solvent used in the polymerization process is a hydrocarbon solvent that is inert with respect to the coordination catalyst. Such solvents are known and include hexane, heptane, octane, cyclohexane, methylcyclohexane and hydrogenated naphtha. The solvent used in the polymerization process is preferably also used in the preparation of the coordination catalyst. The hydrocarbon solvent is the major component of the polymerization mixture fed to the reactor, usually comprising at least 60% by weight of the reaction mixture. In the process the monomer is dissolved in the solvent.

The mixture that exits from the polymerization reactor comprises polymer, unreacted monomers, coordination catalyst some of which remains in an active state, and hydrocarbon solvent. A deactivator is added to the mixture to terminate the polymerization process. In the process of the present invention the deactivator is added in two steps.

In the first step, a minor amount of a nitrogenous base is added to the polymerization mixture. The nitrogenous base is of the formula $NR^1R^2R^3$ where $R^1$, $R^2$ and $R^3$ are independently selected from the group consisting of H, saturated alkyls having 1–20 carbon atoms and $-SiR^4R^5R^6$ where each of $R^4$, $R^5$ and $R^6$ is independently selected from saturated alkyls having 1–20 carbon atoms. Steric considerations may be significant with some nitrogenous bases and thus the nitrogenous base should not contain more than two $-SiR^4R^5R^6$ groups. Preferably, each of $R^1$, $R^2$ and $R^3$ is H i.e. the nitrogenous base is ammonia. In a preferred embodiment, the nitrogenous base is in the form of an aqueous solution in which the ratio of water to nitrogenous base is not greater than 5. In embodiments, at least one of $R^1$, $R^2$ and $R^3$ is methyl or ethyl. In other embodiments, at least one of $R^1$, $R^2$ and $R^3$ is H and at least one other is $-SiR^4R^5R^6$, especially where all of $R^4$, $R^5$ and $R^6$ are either methyl or ethyl.

The amount of nitrogenous base added is not more than 2.5 moles of nitrogenous base, plus water if the nitrogenous base is in the form of an aqueous solution, per mole of halogen plus alkyl radicals in the coordination catalyst; as used herein a mole of a catalyst component such as diethyl aluminum chloride, as used in the preparation of the catalyst, is deemed to contain two equivalents of ethyl groups and one equivalent of chlorine, the sum of such equivalents being referred to as "moles of halogen plus alkyl groups", and the calculation of the amount of nitrogenous base is to be made on such a basis. Preferably 0.25–1.5 moles are added per mole of halogen plus alkyl radicals in the catalyst.

In the second step the deactivator is a solution of a non-stoichiometric salt of an alkaline earth metal or zinc and at least one aliphatic monocarboxylic acid dissolved in hydrocarbon solvent, especially a salt having excess acid to facilitate solubility. In particular the hydrocarbon solvent used for the deactivator is the same as the solvent used in the polymerization process. If a different solvent is used, it must be compatible with the solvent used in the polymerization process, not cause precipitation of any component of the polymerization mixture and not cause adverse effects on the solvent recovery system associated with the polymerization process.

The salt of the second deactivator solution must be dissolved in the solvent in order to obtain intimate contact between the deactivator and the product of reaction of catalyst with the first deactivator, and to obtain uniform dispersion of the deactivator and catalyst residues i.e. the form of the catalyst after deactivation, throughout the polymer, thereby facilitating the production of polymer of uniform properties.

In the salt of the deactivator solution, the metal is an alkaline earth metal or zinc, especially magnesium or calcium. The remainder of the salt is derived from at least one aliphatic carboxylic acid, especially such an acid having 6 to 20 carbon atoms. In a preferred embodiment the acid has 8 to 12 carbon atoms. The acid is preferably a branched chain aliphatic acid although straight chain aliphatic acids and cycloaliphatic acids may be used. Moreover the acids may be saturated or unsaturated acids. However the acid must be such that the salt thereof that is used in the process of the present invention is soluble in the hydrocarbon solvent used therein. In preferred embodiments the salt is calcium 2-ethyl hexanoate, calcium naphthenate, calcium iso-stearate or the like.

In the process of the present invention the deactivated polymerization mixture is fed to a separator, which may be a multistage separator, to separate unreacted monomer, hydrocarbon solvent and any other volatile matter from the polymer. In contrast to the usual practice in a solution process, no steps are taken to remove catalyst residues and/or deactivator from the polymer using adsorbents or other techniques. After separation from solvent and unreacted monomer, the polymer may be extruded into water and cut into pellets or other suitable comminuted shapes.

The recovered polymer may then be treated with saturated steam, optionally admixed with air, at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range 0.25:1 to 1:1 with the total amount of antioxidant being in the range of 400 to 2000 ppm.

The use of nitrogenous base, and optionally water, as part of the deactivator system of the present invention is important not only with respect to the amount of isomerization of the comonomer but also with respect to the colour of the polymer subsequently obtained and with respect to impurities that might be introduced into the polymerization process. The by-products formed when nitrogenous base, and water, are used as deactivator tend to be of low volatility whereas the by-products formed when organic deactivators are used tend to be aldehydes, ketones, organic acids and the like. Such organic compounds may be difficult to remove in the solvent recycle process associated with the polymerization process. The use of controlled amounts of amine, and of water, as part of the deactivator system can result in an improved solution polymerization process.

The polymers produced by the process of the present invention are capable of being fabricated into a wide variety of articles, as is known for homopolymers of ethylene and copolymers of ethylene and higher alpha-olefins.

Unless otherwise noted, in the examples hereinafter the following procedures were used:

The reactor was a 95 ml (depth=15.1 mm, diameter=88.9 mm) pressure vessel fitted with a six-bladed agitator having a diameter of 66.7 mm, a heating jacket, pressure and temperature controllers, two feed lines and an outlet line. The feed lines were located adjacent to the tips of the agitator blades while the outlet line was adjacent to the centre of the agitator. The catalyst precursors and other ingredients were prepared as solutions in cyclohexane which had been purified by being passed through a silica gel bed, stripped with nitrogen and passed through another silica gel bed followed by beds of 4X molecular sieve and of alumina. The monomer(s) was metered directly into the reactor. The rates of feed of the first and second components of the catalyst were adjusted to produce the desired conditions in the reactor.

Two types of experiments were performed:

(a) Measurement of Isomerization

Unless stated to the contrary, an ethylene concentration of about 5% by weight and a butene-1 concentration of about 3% by weight were used in experiments to measure the amount of isomerization.

The effluent from the polymerization reactor was passed through carbon steel tubing of 4.57 mm ID that was heated to 320° C. The hold-up time of the effluent in this tubing was about one minute. The effluent was then fed into a stainless steel tubular reactor of 10.6 mm ID which was maintained at 320° C. The first deactivator was injected concentrically into the middle of the effluent stream at the inlet to the tubular reactor. The second deactivator, a 4.2 mmole solution of calcium 2-ethyl hexanoate, was injected into the effluent stream at the exit to the tubular reactor; the amount of second deactivator was about 0.17 moles of calcium for each mole of chlorine plus alkyl radicals in the catalyst.

The solvent and monomers were flashed off from the treated effluent thus obtained and analyzed for butene-1, cis-butene-2 and trans-butene-2 using gas chromatography. The amount of isomerization was calculated using the formula:

Amount of isomerization (%) =

$$\frac{\text{Amount of butene-2}}{\text{Amount of butene-1 plus butene-2}} \times 100$$

(b) Measurement of Polymer Colour

An ethylene concentration of up to 15 wt. % was used in these experiments. The reactor effluent was passed through 4.57 mm ID tubing heated to a temperature of 296° C. prior to injection of the first deactivator. The hold-up time in the tubing was about 0.2 min. After injection of the first deactivator, the resultant stream was passed through a further length of 4.57 mm ID tubing, which was heated to 320° C., for a hold-up time of about 2.8 min. A second deactivator was then injected into the stream. The deactivated polymer stream thus obtained was maintained at 320° C. for about 15 seconds and then flashed into the barrel of a ram extruder heated to about 220° C., the gaseous matter obtained being removed from the extruder. The molten polymer obtained was periodically extruded into a mould having a depth of 1 mm and a diameter of 40 mm and then rapidly cooled to ambient temperature. The plaques thus obtained were then stripped for eight hours with a mixture of saturated steam and air (7:1, by volume) at atmospheric pressure then dried for 4 hours using air at 100° C. The colour of the plaques was then measured on a Hunter TM L,a,b colourimeter, the measurement being on four plaques stacked in a holder having a black background.

The present invention is illustrated by the following examples. The solvent used in the examples was cyclohexane.

EXAMPLE I

The catalyst was prepared by in-line mixing of (i) a solution of titanium tetrachloride (0.5 mmoles/liter) and vanadium oxytrichloride(0.5 mmoles/liter) in cyclohexane with (ii) a solution of 1.9 mmoles/liter of diethylaluminum chloride in cyclohexane, the atomic ratio of aluminum to titanium plus vanadium being 1.67:1. After about 30 seconds, a stream of hot cyclohexane was injected into the catalyst mixture, the resultant stream having a temperature of 210° C. The stream was maintained at this temperature for about one minute.

The catalyst obtained using the above procedure was fed into the reactor. A co-catalyst of triethyl dimethyl siloxalane was also fed to the reactor. The co-catalyst was used as a 4 mmole/liter solution in cyclohexane and the rate of feed to the reactor was adjusted to be the same as the rate of feed of catalyst. The reactor effluent was treated as described hereinbefore for experiments for measurement of the amount of isomerization.

The first deactivators used and the resultant amount of isomerization are shown in Table I. Runs 5, 8, 14, and 17 are comparative runs and should be compared with the other run(s) grouped therewith.

The results in Table I show the reduced amount of isomerization with the deactivators of the present invention.

TABLE I

| Run No. | First Deactivator | Ratio* | Amount of Isomerization (%) |
|---|---|---|---|
| 1 | water/sec-butylamine | 0.63/1.02 | 1 |
| 2 | water | 0.63 | 11 |
| 3 | sec-butylamine | 1.02 | 2 |
| 4 | water/sec-butylamine | 0.63/1.02 | 2 |
| 5 | water | 0.63 | 18 |
| 6 | ammonia | 1.12 | 1 |
| 7 | water/ammonia | 0.63/1.12 | 2 |
| 8 | water | 0.63 | 16 |
| 9 | ammonia | 1.02 | 3 |
| 10 | water/ammonia | 0.63/1.02 | 3 |
| 11 | water/ammonia | 0.63/0.54 | 4 |
| 12 | water/ammonia | 0.63/0.24 | 5 |
| 13 | water/ammonia | 0.63/0.10 | 8 |
| 14 | water | 0.63 | 19 |
| 15 | $HN(SiMe_3)_2$ | 1.02 | 5 |
| 16** | water/$HN(SiMe_3)_2$ | 0.63/1.02 | 3 |
| 17 | water | 0.63 | 19 |

*moles of first deactivator: moles of chlorine plus alkyl radicals in catalyst.
**the water and silicon compound were injected separately.
NB. Me = methyl

EXAMPLE II

Ethylene was polymerized using the procedure of Example I. The effluent from the reactor was treated as described hereinbefore for experiments for measurement of polymer colour. The second deactivator was a 4.2 mmolar solution of calcium caprylate/caprate in cyclohexane. The molar ratio of this deactivator to chlorine plus alkyl radicals was 0.27:1.

The first deactivators used and the colour of the resultant polymers are shown in Table II. Runs 18 and 22 are comparative runs.

The results in Table II show that the colour of the polymer is the same, within experimental error, in all runs.

TABLE II

| Run No. | First Deactivator | Ratio* | Colour L. value | Colour b value |
|---|---|---|---|---|
| 18 | water | 0.54 | 74.7 | −1.0 |
| 19 | water/ammonia | 0.27/0.49 | 74.1 | −1.6 |
| 20 | water/ammonia | 0.27/1.07 | 75.2 | −1.2 |
| 21 | ammonia | 1.07 | 74.2 | −1.3 |
| 22 | water | 0.27 | 74.1 | −0.9 |

*moles of first deactivator: moles of chlorine plus alkyl radicals in catalyst.

We claim:

1. A solution polymerization process for the preparation of high molecular weight polymers of alpha-olefins selected from the group consisting of homopolymers of ethylene and copolymers of ethylene and a $C_4$–$C_{12}$ alpha-olefin, said process comprising feeding monomer selected from the group consisting of ethylene and mixtures of ethylene and at least one $C_4$–$C_{12}$ alpha-olefin, a coordination catalyst and inert hydrocarbon solvent to a reactor, said catalyst containing halogen and alkyl radicals and being a titanium-based and/or vanadium-based coordination catalyst, polymerizing said monomer at a temperature of up to 320° C. and a pressure of less than 25 MPa, deactivating the catalyst in the solution so obtained by sequentially admixing therewith (a) a minor amount of a nitrogenous base followed by (b) a solution of a nonstoichiometric salt of an alkaline earth metal or zinc with aliphatic monocarboxylic acid dissolved in hydrocarbon solvent compatible with the solvent used in the polymerization process, said nitrogenous base being of the formula $NR^1R^2R^3$, where $R^1$, $R^2$, and $R^3$ are indpendently selected from the group consisting of H, saturated alkyls having 1–20 carbon atoms and —$SiR^4R^5R^6$, where each of $R^4$, $R^5$ and $R^6$ is independently selected from saturated alkyls having 1–20 carbon atoms, with the proviso that the nitrogenous base does not contain more than two —$SiR^4R^5R^6$ groups, separating the hydrocarbon solvent and other volatile matter from the resultant solution and recovering a composition comprisng said high molecular weight polymer, the amount of the nitrogenous base being not more than 2.5 moles of nitrogenous base per mole of halogen plus alkyl radical in the coordination catalyst.

2. The process of claim 1 in which the nitrogenous base of step (a) is in the form of an aqueous solution and the amount of nitrogenous base plus water is not more than 2.5 mole of said base plus water per mole of halogen plus alkyl radicals in the coordination catalyst.

3. The process of claim 1 in which the nitrogenous base is ammonia.

4. The process of claim 2 in which the nitrogenous base is ammonia.

5. The process of claim 1 in which at least one of $R^1$, $R^2$ and $R^3$ is H with the proviso that at least one of $R^1$, $R^2$ and $R^3$ is methyl or ethyl.

6. The process of claim 1 in which at least one of $R^1$, $R^2$ and $R^3$ is —$SiR^4R^5R^6$.

7. The process of claim 6 in which $R^4$, $R^5$ and $R^6$ are each methyl or ethyl.

8. The process of claim 1 in which the polymerization temperature is in the range 105°–310° C.

9. The process of claim 1 in which the coordination catalyst is a titanium-based coordination catalyst.

10. The process of claim 1 in which the aliphatic monocarboxylic acid of the deactivator of step (b) has 6 to 20 carbon atoms.

11. The process of claim 10 in which the aliphatic monocarboxylic acid of the deactivator of step (b) has 8 to 12 carbon atoms.

12. The process of claim 1 in which the salt of the deactivator of step (b) is a calcium salt.

13. The process of claim 1 in which the hydrocarbon solvent of the deactivator solution of step (b) is the same as that fed to the reactor.

* * * * *